(12) United States Patent
Imura et al.

(10) Patent No.: US 10,060,095 B2
(45) Date of Patent: Aug. 28, 2018

(54) HYBRID WORK MACHINE

(71) Applicant: Hitachi Construction Machinery Co., Ltd, Taito-ku, Tokyo (JP)

(72) Inventors: Shinya Imura, Toride (JP); Masafumi Hita, Tsuchiura (JP); Hiroaki Amano, Ushiku (JP); Seiji Ishida, Hitachinaka (JP); Ken Takeuchi, Kasumigaura (JP); Itaru Naya, Tsuchiura (JP); Chiaki Takahashi, Hitachinaka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 52 days.

(21) Appl. No.: 15/118,494

(22) PCT Filed: Feb. 3, 2015

(86) PCT No.: PCT/JP2015/053009
§ 371 (c)(1),
(2) Date: Aug. 12, 2016

(87) PCT Pub. No.: WO2015/170489
PCT Pub. Date: Nov. 12, 2015

(65) Prior Publication Data
US 2017/0145658 A1    May 25, 2017

(30) Foreign Application Priority Data
May 7, 2014  (JP) .................................. 2014-096344

(51) Int. Cl.
*E02F 9/20*      (2006.01)
*E02F 9/22*      (2006.01)
(Continued)

(52) U.S. Cl.
CPC ............ *E02F 9/2075* (2013.01); *B60K 6/485* (2013.01); *B60W 10/06* (2013.01); *B60W 10/08* (2013.01);
(Continued)

(58) Field of Classification Search
CPC ...... E02F 9/2075; E02F 9/2246; F02D 29/04; F02D 29/06
(Continued)

(56) References Cited

U.S. PATENT DOCUMENTS

2007/0187180 A1*  8/2007  Kagoshima .............. B60K 6/12
                                                              182/232
2011/0029175 A1   2/2011  Kang et al.
(Continued)

FOREIGN PATENT DOCUMENTS

EP    1 383 224 A1    1/2004
JP    2010-127271 A   6/2010
(Continued)

OTHER PUBLICATIONS

International Preliminary Report of Patentability (PCT/IB/338 & PCT/ID/373) issued in PCT Application No. PCT/JP2015/053009 dated Nov. 17, 2016 including English translation of document C2 (Japanese-language Written Opinion (PCT/ISA/237)) previously submitted on Aug. 12, 2016 (Eight (8) pages).
(Continued)

*Primary Examiner* — Nadeem Odeh
(74) *Attorney, Agent, or Firm* — Crowell & Moring LLP

(57) ABSTRACT

A hybrid work machine includes a controller and a temperature sensor that detects an electric storage device temperature. In a case where $(Tp+Tc) \geq Te\_min$, the controller carries out a first comparison in which the controller compares a value of $[(Tp+Tc)-Te\_min]$ with a value of $Ta\_SOC$, and the controller then selects a lower value of the first comparison.
(Continued)

The controller then carries out a second comparison in which the controller compares the selected lower value of the first comparison with a value of [(Tp+Tc)−Te_max]. The controller then sets a higher value of the second comparison as the torque of the assist motor Ta, wherein Tc is an accessory torque, Ta_SOC is an adjustment assist motor torque based on a current state of charge of the electric storage device, Ta is the torque of the assist motor, and Te_max is an engine maximum torque.

5 Claims, 9 Drawing Sheets

(51) Int. Cl.
| | | |
|---|---|---|
| *B60K 6/485* | (2007.10) | |
| *B60W 10/08* | (2006.01) | |
| *B60W 10/06* | (2006.01) | |
| *B60W 20/00* | (2016.01) | |
| *F02D 29/04* | (2006.01) | |
| *F02D 29/06* | (2006.01) | |
| *E02F 3/32* | (2006.01) | |

(52) U.S. Cl.
CPC ........... *B60W 20/00* (2013.01); *E02F 9/2246* (2013.01); *E02F 9/2296* (2013.01); *F02D 29/04* (2013.01); *F02D 29/06* (2013.01); *B60W 2300/17* (2013.01); *B60Y 2200/412* (2013.01); *E02F 3/32* (2013.01); *Y10S 903/903* (2013.01)

(58) Field of Classification Search
USPC ........................................................ 701/50
See application file for complete search history.

(56) References Cited

U.S. PATENT DOCUMENTS

| | | | |
|---|---|---|---|
| 2011/0270481 A1* | 11/2011 | Koga | B60L 1/003 701/22 |
| 2013/0197768 A1* | 8/2013 | Imura | B60W 10/06 701/50 |
| 2014/0020375 A1 | 1/2014 | Fujishima et al. | |
| 2014/0062096 A1* | 3/2014 | Yamashita | H02P 9/00 290/40 R |
| 2016/0340870 A1* | 11/2016 | Takeo | B60K 6/485 |

FOREIGN PATENT DOCUMENTS

| | | | | |
|---|---|---|---|---|
| JP | 2010-193602 A | 9/2010 | | |
| JP | 2012-246631 A | 12/2012 | | |
| JP | 2013-52866 A | 3/2013 | | |
| KR | 10-2011-0012036 A | 2/2011 | | |
| WO | WO-2015133625 A1 * | 9/2015 | | B60K 6/485 |

OTHER PUBLICATIONS

Korean-language Office Action issued in counterpart Korean Application No. 10-2016-7021716 dated Apr. 7, 2017 (Seven (7) pages).
International Search Report (PCT/ISA/210) issued in PCT Application No. PCT/JP2015/053009 dated May 12, 2015 with English translation (Two (2) pages).
Japanese-language Written Opinion (PCT/ISA/210) issued in PCT Application No. PCT/JP2015/053009 dated May 12, 2015 (Five (5) pages).
Extended European Search Report issued in counterpart European Application No. 157 9107.8 dated Dec. 22, 2017 (seven pages).

* cited by examiner

HYBRID WORK MACHINE

TECHNICAL FIELD

The present invention relates to a hybrid work machine and more specifically, the present invention relates to a hybrid work machine provided with a power storage device on which a warm-up operation can be performed by charging and discharging.

BACKGROUND ART

In recent years, there has been known a hybrid work machine having an engine downsized from viewpoints of energy saving and causing an electric storage device and a motor-generator to assist the engine in output to solve the problem of insufficient output resulting from engine downsizing. In such a hybrid work machine, there is a probability that sufficient electric power for assisting the engine cannot be supplied to the motor-generator in a low-temperature environment where it may be necessary to perform a warm-up operation on the engine because the internal resistance of the electric storage device increases and a discharge current falls.

To address such a problem, there is known a hybrid construction machine warm-up method (see, for example, Patent Literature 1) including actuating an engine to perform a warm-up operation thereon, changing a target charge rate of an electric storage device, actuating a motor-generator, and charging or discharging the electric storage device, thereby generating heat from the electric storage device (warming up the electric storage device) when a temperature of the electric storage device is lower than a preset temperature.

PRIOR ART DOCUMENTS

Patent Document
Patent Literature 1: JP-2010-127271-A

SUMMARY OF THE INVENTION

Problem to be Solved by the Invention

According to the abovementioned conventional technique, an electric storage device can be efficiently and promptly warmed up without separately using a heating device.

However, if the motor-generator is charged or discharged without consideration to operating states of a hydraulic pump and accessories mounted in a work machine as in this warm-up method, lug-down (overload deceleration) or over-revolution (overspeed) possibly occurs to the engine.

Specifically, if a high brake torque is generated in the motor-generator in order to charge the electric storage device with high electric power when a torque (load torque) necessary to drive the hydraulic pump or the accessories is high, then engine overload occurs, and engine lug-down or, depending on situations, engine stall possibly occurs. Furthermore, if high drive torque is generated in the motor-generator in order to discharge the electric storage device with high electric power when the load torque of the hydraulic pump or the accessories is low, engine over-revolution possibly occurs and, depending on situations, overspeed results in a failure.

The present invention has been made on the basis of the abovementioned circumstances and an object of the present invention is to provide a hybrid work machine capable of performing a warm-up operation on an electric storage device by charging and discharging while suppressing the occurrence of lug-down or over-revolution to an engine.

Means for Solving the Problems

To attain the abovementioned object, according to a first aspect of the present invention, provided is a hybrid work machine including: an engine; an assist motor mechanically connected to the engine, causing a discharge by generating a drive torque, and generating electric power by generating a brake torque; a hydraulic pump driven by a total torque of the engine and the assist motor; an electric storage device storing the electric power generated by the assist motor and supplying the electric power when the assist motor is discharged; an inverter allowing the electric storage device and the assist motor to transmit and receive the electric power therebetween; and a controller outputting a torque command signal to the inverter in order to control the drive torque or the brake torque of the assist motor. The controller includes a torque-command-value arithmetic unit calculating a hydraulic pump torque necessary to drive the hydraulic pump, and calculating the torque command signal that is equal to or lower than a value obtained by subtracting a preset minimum torque of the engine from the hydraulic pump torque.

Effect of the Invention

According to the present invention, it is possible to perform a warm-up operation on an electric storage device by charging and discharging while suppressing the occurrence of lug-down or over-revolution to an engine.

MODE FOR CARRYING OUT THE INVENTION

Embodiments of the present invention will be described hereinafter while taking a hydraulic excavator as an example of a hybrid work machine. It is to be noted that the present invention is applicable to overall hybrid work machines each provided with an electric storage device and the application of the present invention is not limited to the hydraulic excavator. Furthermore, a case where a lithium-ion battery is employed as the electric storage device will be described in the present embodiment; however, the electric storage device is not limited to the lithium-ion battery. The other electric storage devices the outputs of which fall at a low temperature such as a capacitor and a nickel-hydrogen battery can be similarly employed as the electric storage device.

Figure 1:
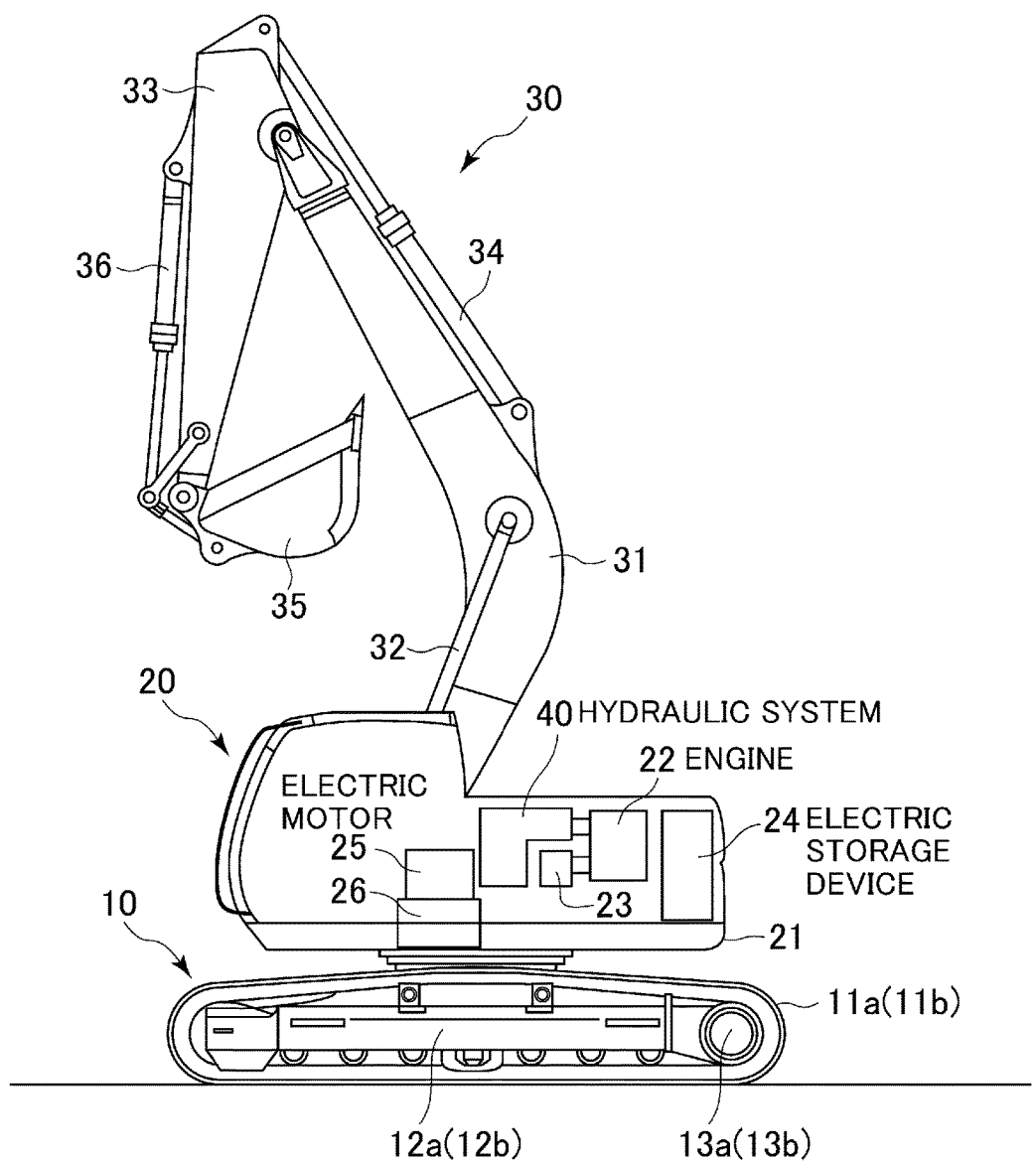
FIG. 1 is a side view illustrating an embodiment of a hybrid work machine according to the present invention.

FIG. 1 is a side view illustrating an embodiment of a hybrid work machine according to the present invention. In FIG. 1, the hydraulic excavator is provided with a track structure 10, a swing structure 20 which is provided swingably on the track structure 10, and an excavator mechanism 30 which is provided to be attached to the swing structure 20.

The track structure 10 is composed by a pair of crawlers 11a and 11b and crawler frames 12a and 12b (FIG. 1 only illustrate one side thereof), a pair of track hydraulic motors 13a and 13b controlling the respective crawlers 11a and 11b to be driven independently of each other, a speed-reduction mechanism therefor, and the like.

The swing structure 20 is composed by a swing frame 21, an engine 22 which is provided on the swing frame 21 and serves as a prime mover, an assist motor 23 which is driven by the engine 22, a swing electric motor 25, an electric storage device 24 connected to the assist motor 23 and the swing motor 25, a speed-reduction mechanism 26 reducing a revolving speed of the swing electric motor 25, and the like, a drive force of the swing electric motor 25 is transmitted to the swing structure 20 via the speed-reduction mechanism 26, and the drive force drives the swing structure 20 (swing frame 21) to swing relatively to the track structure 10.

Furthermore, an excavator mechanism (front device) 30 is mounted on the swing structure 20. The excavator mechanism 30 is composed by a boom 31, a boom cylinder 32 for driving the boom 31, an arm 33 which is rotatably and pivotally supported near a tip end portion of the boom 31, an arm cylinder 34 for driving the arm 33, a bucket 35 which is rotatably and pivotally supported on a tip end of the arm 33, a bucket cylinder 36 for driving the bucket 35, and the like.

Furthermore, a hydraulic system 40 for driving hydraulic actuators such as the track hydraulic motors 13a and 13b, the boom cylinder 32, the arm cylinder 34, and the bucket cylinder 36 as described above is mounted on the swing frame 21 of the swing structure 20.

Figure 2:
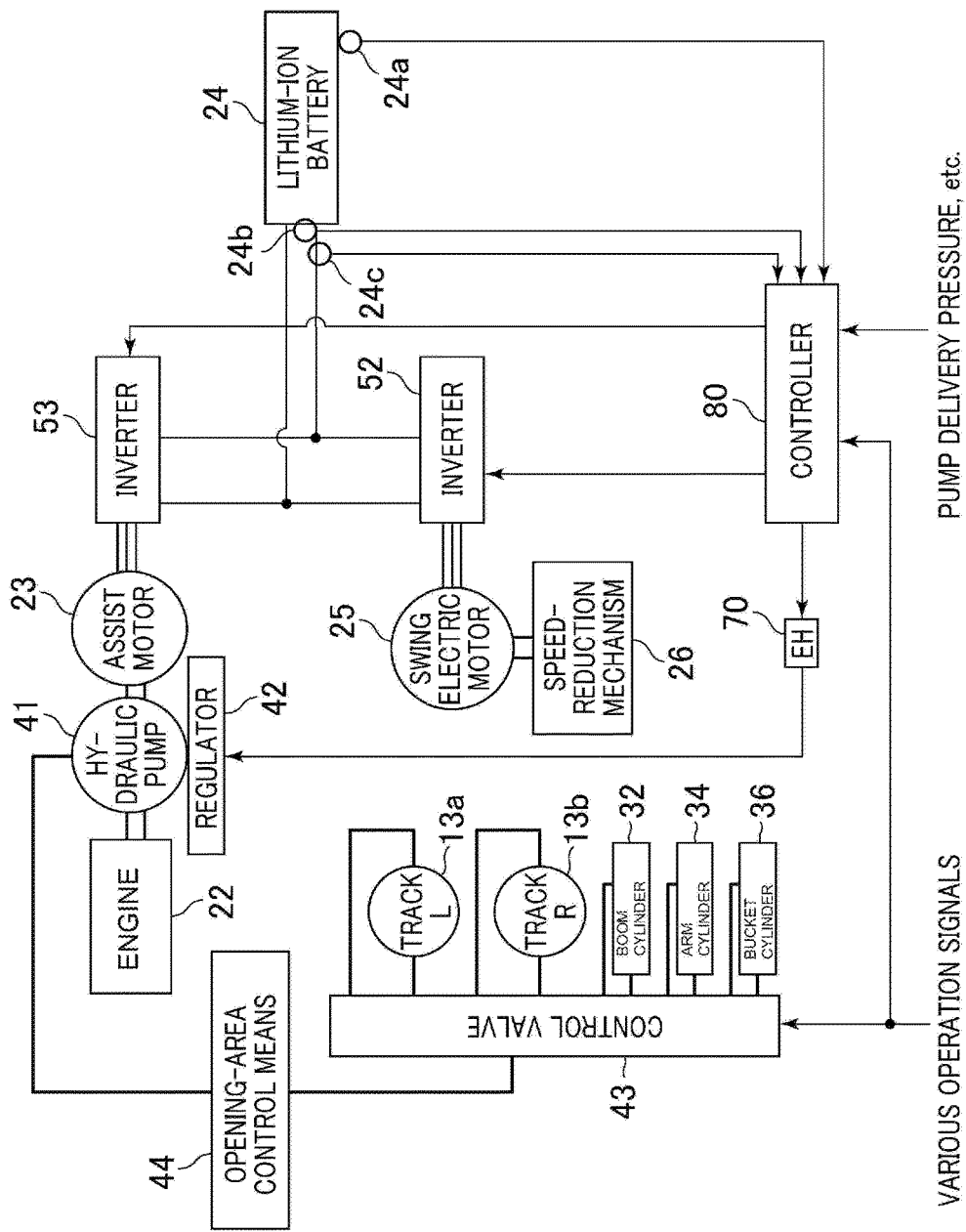
FIG. 2 is a system configuration diagram of electric and hydraulic devices which constitute the embodiment of the hybrid work machine according to the present invention.

A system configuration of electric and hydraulic devices of the hydraulic excavator will be described next with reference to FIG. 2. FIG. 2 is a system configuration diagram of the electric and hydraulic devices which constitute the embodiment of the hybrid work machine.

The hydraulic system 40 is provided with a variable-displacement hydraulic pump 41 which is driven to rotate by the engine 22, a regulator 42 which changes a capacity of the hydraulic pump 41 by changing a tilting angle, a control valve 43 which actuates various spools in response to an operation command (a hydraulic pilot signal) from an operation lever device (not shown) for operations other than swing and controls a flow rate and a direction of a hydraulic fluid supplied to the boom cylinder 32, the arm cylinder 34, the bucket cylinder 36, and the track hydraulic motors 13a and 13b, and opening-area control means (a solenoid valve) 44 which can temporarily reduce an opening area of a part of a hydraulic line between the hydraulic pump 41 and the control valve 43. The hydraulic pump 41 delivers the hydraulic fluid proportional to a product between a revolving speed and the capacity thereof.

It is noted that the operation command (hydraulic pilot signal) input to the control valve 43 can be cut off by a gate lock lever (not shown). When the gate lock lever is set into a locking state, the operation command (hydraulic pilot signal) is cut off; therefore, even when the operation lever device is actuated, the various spools are each held in a neutral state and the boom cylinder 32, the arm cylinder 34, the bucket cylinder 36, and the track hydraulic motors 13a and 13b do not operate.

An electric system is provided with the assist motor 23 which is mechanically coupled to the hydraulic pump 41, a lithium-ion battery 24 which serves as a power supply, the swing electric motor 25, a swing-electric-motor inverter 52 for driving the swing electric motor 25, and an assist-motor inverter 53 for driving the assist motor 23.

DC power from the lithium-ion battery 24 is input to the swing-electric-motor inverter 52 and the assist-motor inverter 53. The swing electric motor 25 drives the swing structure 20 via the speed-reduction mechanism 26. The lithium-ion battery 24 is discharged when the assist motor 23 or the swing electric motor 25 generates a drive torque, and the lithium-ion battery 24 is charged when the assist motor 23 or the swing electric motor 25 generates a brake torque.

The lithium-ion battery 24 is provided with a temperature sensor 24a which detects a temperature of the lithium-ion battery 24, a voltage sensor 24b which detects a voltage of the lithium-ion battery 24, and a current sensor 24c which detects a current of the lithium-ion battery 24, and a temperature signal, a voltage signal, and a current signal for the lithium-ion battery 24 detected by the respective sensors are input to a controller 80.

The controller 80 computes a torque command value for the swing electric motor 25, a torque command value for the assist motor 23, and a capacity command value to the hydraulic pump 41 using various operation command signals, a delivery pressure signal for the hydraulic pump 41, the temperature, voltage, and current signals for the lithium-ion battery 24, a revolving speed signal for the engine 22, a revolving speed signal for the swing electric motor 25, and the like. A torque command to the swing electric motor 25 is output to the swing-electric-motor inverter 52, and a torque command to the assist motor 23 is output to the assist-motor inverter 53. In response to the output, the swing-electric-motor inverter 52 controls the torque of the swing electric motor 25 and the assist-motor inverter 53 controls the torque of the assist motor 23. A capacity command to the hydraulic pump 41 is output to the regulator 42 via an electric-hydraulic signal conversion device 70 and the regulator 42 controls the capacity of the hydraulic pump 41. The electric-hydraulic signal conversion device 70 converts an electric signal from the controller 80 into a hydraulic pilot signal and corresponds to, for example, a solenoid proportional valve.

Figure 3:
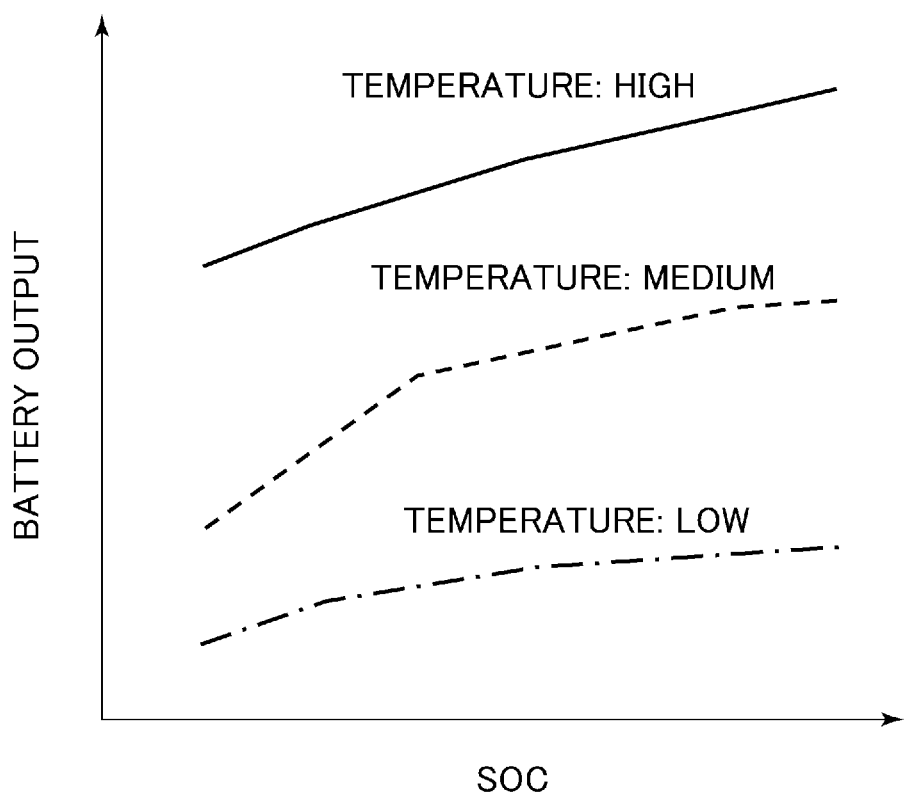
FIG. 3 is a characteristic view illustrating battery output characteristics of a lithium-ion battery which constitutes the embodiment of the hybrid work machine according to the present invention with respect to an SOC and a battery temperature of the lithium-ion battery.

Next, an output of the lithium-ion battery 24 in response to a state of charge (SOC; representing a battery charge state such as a charge rate) and the battery temperature will be described with reference to FIG. 3. FIG. 3 is a characteristic view illustrating battery output characteristics of the lithium-ion battery which constitutes the embodiment of the hybrid work machine according to the present invention, relative to the SOC and the battery temperature thereof. In FIG. 3, a characteristic indicated by a solid line represents a case where the temperature of the lithium-ion battery 24 is high, a characteristic indicated by a dashed line represents a case where the temperature of the lithium-ion battery 24 is low, and a characteristic indicated by a broken line represents a case where the temperature of the lithium-ion battery 24 is medium. As shown in FIG. 3, the battery output greatly falls in a low-temperature environment where the temperature of the lithium-ion battery 24 is low. Owing to this, it is necessary to perform a warm-up operation up to a battery temperature at which a sufficient battery output can be supplied.

Figure 4:
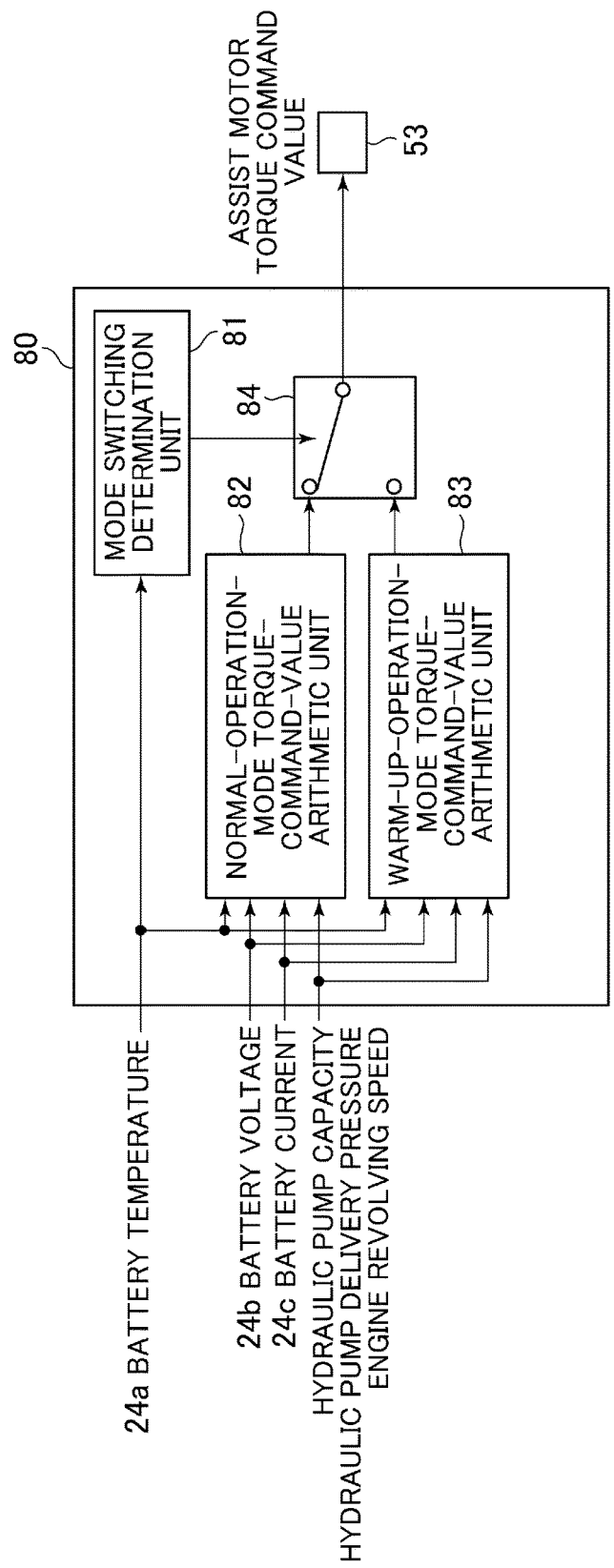
FIG. 4 is a block diagram associated with an assist motor torque command of a controller which constitutes the embodiment of the hybrid work machine according to the present invention.

The calculation of the torque command value for the assist motor 23 including the warm-up operation on the lithium-ion battery 24 in the controller 80 will be described with reference to FIGS. 4 and 5. FIG. 4 is a block diagram associated with the assist motor torque command of the controller which constitutes the embodiment of the hybrid work machine according to the present invention, and FIG. 5 is a characteristic view for illustrating a behavior of a mode switching unit of the controller which constitutes the embodiment of the hybrid work machine according to the present invention.

As shown in FIG. 4, the controller 80 is provided with a mode switching determination unit 81, a normal-operation-mode torque-command-value arithmetic unit 82, a warm-up-operation-mode torque-command-value arithmetic unit 83, and a switch 84. In this case, the normal-operation-mode torque-command arithmetic unit 82 and the warm-up-operation-mode torque-command arithmetic unit 83 are the same in that a command value is calculated so as to control the torque (assist motor torque) generated by the assist motor 23 in a range in which the revolving speed of the engine 22 can be maintained even when the torque of the hydraulic pump 41 or the torque of accessories varies but differ in a method of calculating the assist motor torque command value when there is room for the range of the assist motor torque in which engine revolution can be maintained.

The mode switching determination unit 81 receives the temperature signal for the lithium-ion battery 24 detected by the temperature sensor 24a, compares the input temperature signal with a preset threshold, determines whether the torque command value to the assist motor 23 is set to a normal-operation-mode torque command value or a warm-up-operation-mode torque command value, and outputs a switch signal to the switch 84.

Figure 5:
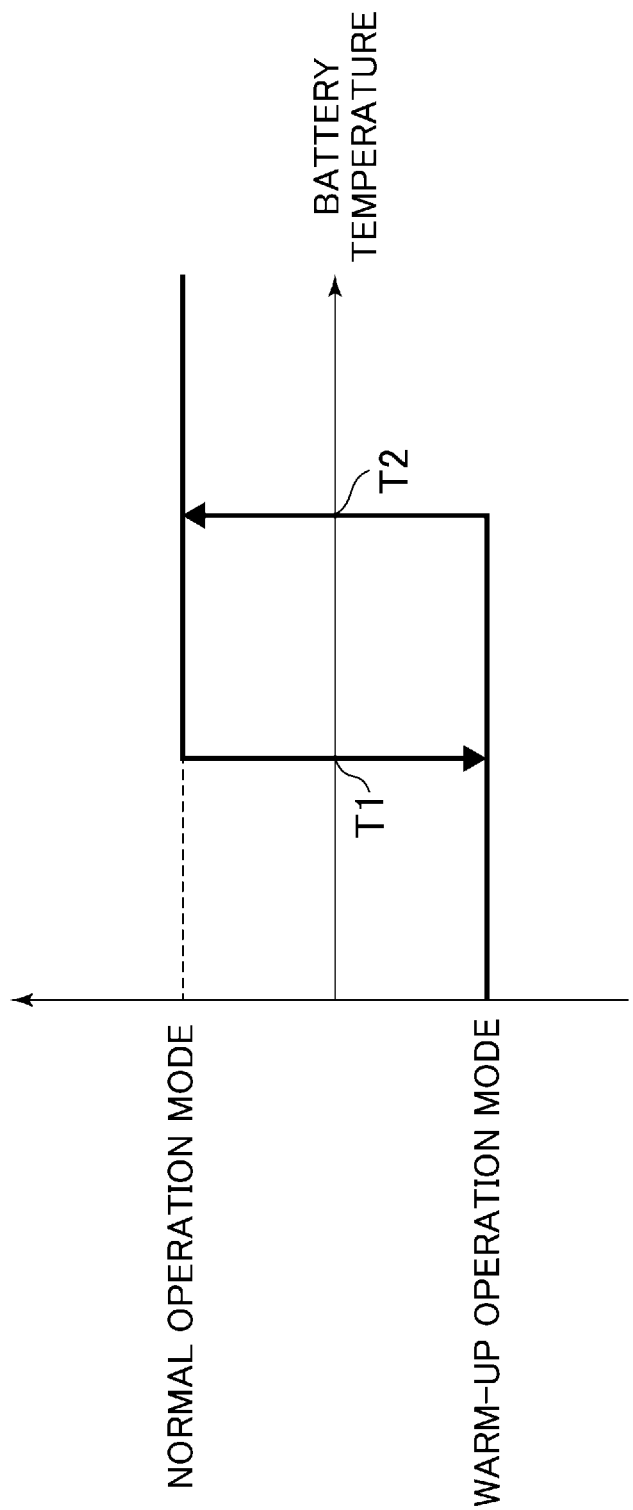
FIG. 5 is a characteristic view for illustrating a behavior of a mode switching unit of the controller which constitutes the embodiment of the hybrid work machine according to the present invention.

As shown in FIG. 5, the mode switching determination unit 81 is provided with a first threshold T1 and a second threshold T2 indicating a temperature set to be higher than a temperature indicated by the first threshold T1. In this case, the mode switching determination unit 81 determines the warm-up operation mode when the temperature of the lithium-ion battery 24 is lower than the first threshold T1, and determines the normal operation mode when the temperature rises to become equal to or higher than the second threshold T2. On the other hand, the mode switching determination unit 81 determines that an operation mode is a normal operation mode when the temperature of the lithium-ion battery 24 is higher than the second threshold, and determines that the operation mode is a warm-up operation mode when the temperature falls to become lower than the first threshold T1. In this way, by providing the mode switching determination unit 81 with the first threshold T1 and the second threshold T2, it is possible to prevent the frequency occurrence of unnecessary mode switching that may occur when only one threshold is used.

The normal-operation-mode torque-command-value arithmetic unit 82 receives the temperature signal for the lithium-ion battery 24 detected by the temperature sensor 24a, the voltage signal for the lithium-ion battery 24 detected by the voltage sensor 24b, the current signal for the lithium-ion battery 24 detected by the current sensor 24c, the capacity signal for the hydraulic pump 41, the delivery pressure signal for the hydraulic pump, and the revolving speed signal for the engine 22, and calculates the torque command value to the assist motor 23 in the normal operation mode on the basis of these signals. The normal-operation-mode torque-command-value arithmetic unit 82 outputs the normal-operation-mode torque command value to one input terminal of the switch 84.

The warm-up-operation-mode torque-command-value arithmetic unit 83 receives the temperature signal for the lithium-ion battery 24 detected by the temperature sensor 24a, the voltage signal for the lithium-ion battery 24 detected by the voltage sensor 24b, the current signal for the lithium-ion battery 24 detected by the current sensor 24c, the capacity signal for the hydraulic pump 41, the delivery pressure signal for the hydraulic pump, and the revolving speed signal for the engine 22, and calculates the torque command value to the assist motor 23 in the warm-up operation mode on the basis of these signals. The warm-up-operation-mode torque-command-value arithmetic unit 83 outputs the warm-up-operation-mode torque command value to the other input terminal of the switch 84.

The torque command value from the normal-operation-mode torque-command-value arithmetic unit 82 is input to one input terminal of the switch 84, the torque command value from the warm-up-operation-mode torque-command-value arithmetic unit 83 is input to the other input terminal thereof, and the switch 84 switches an output signal in response to the switch signal from the mode switching determination unit 81. The output signal from the switch 84 is output to the assist-motor inverter 53 as the assist motor torque command value.

Figure 6:
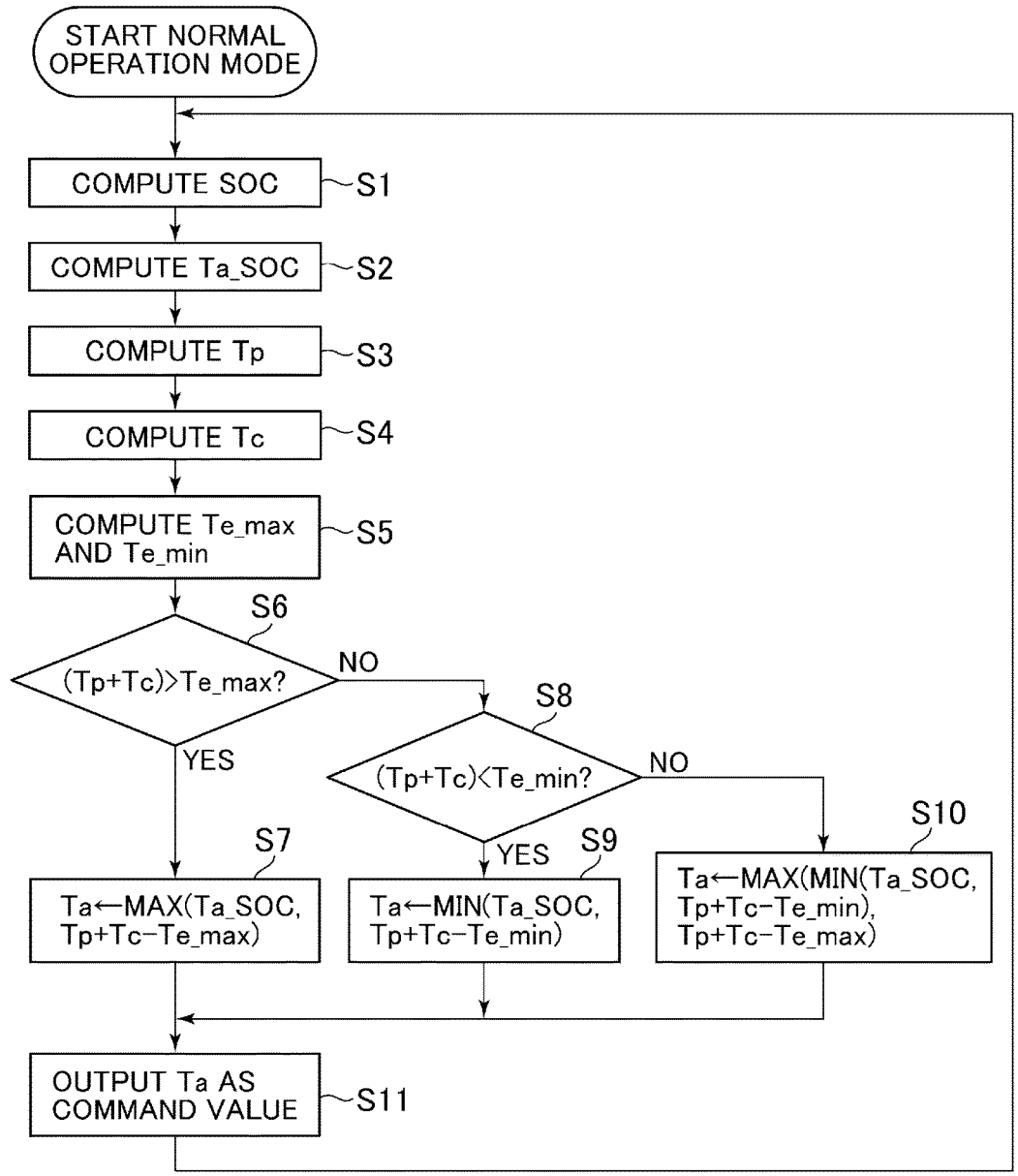
FIG. 6 is a flowchart illustrating normal-operation-mode processing performed by the controller which constitutes the embodiment of the hybrid work machine according to the present invention in a normal operation mode.
Figure 7:
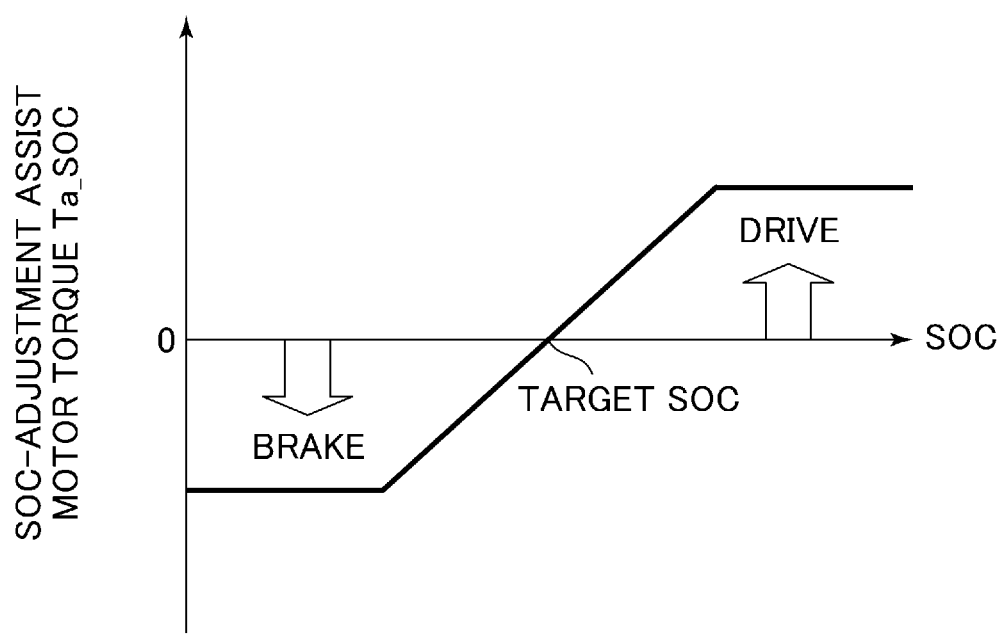
FIG. 7 is a characteristic view illustrating an example of a table for determining an SOC-adjustment torque in the controller which constitutes the embodiment of the hybrid work machine according to the present invention.

Next, a processing content of the normal-operation-mode torque-command-value arithmetic unit 82 will be described with reference to FIGS. 6 and 7. FIG. 6 is a flowchart illustrating normal-operation-mode processing performed by the controller which constitutes the embodiment of the hybrid work machine according to the present invention, and FIG. 7 is a characteristic view illustrating an example of a table for determining an SOC adjustment torque in the controller which constitutes the embodiment of the hybrid work machine according to the present invention. In the subsequent description, the torque generated by the assist motor 23 (assist motor torque) is denoted by Ta, the torque at a time of driving is denoted by a positive torque, and the torque at a time of braking is denoted by a negative torque.

As shown in FIG. 6, the normal-operation-mode torque-command-value arithmetic unit 82 estimates a current SOC (Step S1). Specifically, the normal-operation-mode-torque command-value arithmetic unit 82 estimates the current SOC by the following expression.

$$\text{Current SOC} = \text{SOC}(0) + (\text{charging/discharging-current integrated value during operation of excavator}) / (\text{fully charged capacity of battery})) \qquad (1)$$

In mathematical expression (1), SOC(0) is an SOC before operation of the excavator and calculated from the battery voltage and the battery temperature at a time of starting the excavator on the basis of the preset table. A variation is calculated by a ratio of the charging/discharging current integrated value during the operation of the excavator to the fully charged capacity of the lithium-ion battery 24, and the SOC before the operation of the excavator and the variation are added up, thereby calculating the current SOC.

The normal-operation-mode torque-command-value arithmetic unit 82 calculates an SOC-adjustment assist motor torque Ta_SOC (Step S2). Specifically, the normal-operation-mode torque-command-value arithmetic unit 82 calculates the Ta_SOC in response to the current SOC of the lithium-ion battery 24 on the basis of the example of the table shown in FIG. 7. As shown in FIG. 7, when a value of the current SOC is close to a target SOC value, the Ta_SOC is set to have a small absolute value in order to suppress the generation of heat by the lithium-ion battery 24 or the assist motor 23 as much as possible. The assist motor 23 is driven (discharged) when the value of the current SOC is higher than the target SOC, and the assist motor 23 is braked (charged) when the value of the current SOC is lower than the target SOC, thereby controlling the current SOC to be close to the target SOC.

The normal-operation-mode torque-command-value arithmetic unit 82 calculates a torque (hydraulic pump torque) Tp for driving the hydraulic pump 41 (Step S3). Specifically, the normal-operation-mode torque-command-value arithmetic unit 82 calculates the torque by the following expression.

$$Tp = P \times q / (2\pi \times \eta) \qquad (2)$$

In mathematical expression (2), P is the delivery pressure of the hydraulic pump 41 and q is the capacity of the hydraulic pump 41. η is pump efficiency of the hydraulic pump 41 and either may be a preset constant value or may be calculated from the revolving speed, the capacity, the delivery pressure and the like of the hydraulic pump 41 on the basis of the preset table.

The normal-operation-mode torque-command-value arithmetic unit 82 calculates a torque (accessory torque) Tc necessary for driving accessories (Step S4). In this case, the accessory torque Tc may be either a preset constant value or a value switched by starting or stopping an air conditioner.

The normal-operation-mode torque-command-value arithmetic unit 82 calculates an engine maximum torque Te_max and an engine minimum torque Te_min (Step S5). Specifically, the normal-operation-mode torque-command-value arithmetic unit 82 calculates the engine maximum torque Te_max and the engine minimum torque Te_min from the revolving speed of the engine 22 on the basis of the preset table.

The normal-operation-mode torque-command-value arithmetic unit 82 determines whether a total value (Tp+Tc) of the hydraulic pump torque Tp and the accessory torque Tc exceeds the engine maximum torque Te_max (Step S6). When the (Tp+Tc) exceeds the Te_max, the assist motor 23 needs to generate a drive torque equal to or higher than ((Tp+Tc)−Te_max) in order to maintain the engine revolving speed (suppress lug-down). When the (Tp+Tc) exceeds the Te_max, a determination result is YES and processing goes to (Step S7); otherwise, a determination result is NO and the processing goes to (Step S8).

The normal-operation-mode torque-command-value arithmetic unit 82 compares a value of ((Tp+Tc)−Te_max) with a value of the SOC-adjustment assist motor torque Ta_SOC and sets the higher value as the assist motor torque Ta (Step S7).

In (Step S6), when the (Tp+Tc) corresponds to a case other than the case where (Tp+Tc) exceeds the Te_max, the normal-operation-mode torque-command-value arithmetic unit 82 determines whether the total valve (Tp+Tc) of the hydraulic pump torque Tp and the accessory torque Tc is lower than the minimum torque Te_min (Step S8). When the (Tp+Tc) is lower than the Te_min, the assist motor 23 needs to generate a brake torque equal to or lower than a numeric value calculated as represented by ((Tp+Tc)−Te_min) in order to maintain the engine revolving speed (suppress over-revolution). That is, when the (Tp+Tc) is higher than the Te_min, there is a probability of generating the drive torque; however, when the (Tp+Tc) is lower than the Te_min, it is necessary to generate the brake torque. When the (Tp+Tc) is lower than the Te_min, a determination result is YES and the processing goes to (Step S9); otherwise, the determination result is NO and the processing goes to (Step S10).

The normal-operation-mode torque-command-value arithmetic unit 82 compares the value of ((Tp+Tc)−Te_min) with the value of the SOC-adjustment assist motor torque Ta_SOC and sets the lower value as the assist motor torque Ta (Step S9).

In (Step S8), when the (Tp+Tc) corresponds to a case other than the case where the (Tp+Tc) is lower than the Te_min, the normal-operation-mode torque-command-value arithmetic unit 82 compares the value of ((Tp+Tc)−Te_min) with the value of the SOC-adjustment assist motor torque Ta_SOC, selects the lower value, compares this selected value with a value of ((Tp+Tc)−Te_max), and sets the higher value as the assist motor torque Ta (Step S10). When the processing goes to (Step S10) by way of (Step S6) and (Step S8), the assist motor 23 does not need to be driven or braked in order to maintain the engine revolving speed. However, when the assist motor torque Ta is excessively high, over-revolution possibly occurs, and when the assist motor torque is excessively low (high on a negative side), lug-down possibly occurs. For these reasons, the assist motor torque Ta is set to the restricted value as described above.

The normal-operation-mode torque-command-value arithmetic unit 82 outputs the assist motor torque Ta to the assist-motor inverter 53 as the command value (Step S11). After execution of the processing in (Step S11), the processing returns to (Step S1).

As described so far, in the normal operation mode, the assist motor 23 can be controlled so as to make the SOC close to the target SOC in the range in which the revolving speed of the engine 22 can be maintained even when the hydraulic pump torque or the accessory torque varies and so as to prevent the lithium-ion battery 24 or the assist motor 23 from excessively generating heat.

Figure 8:
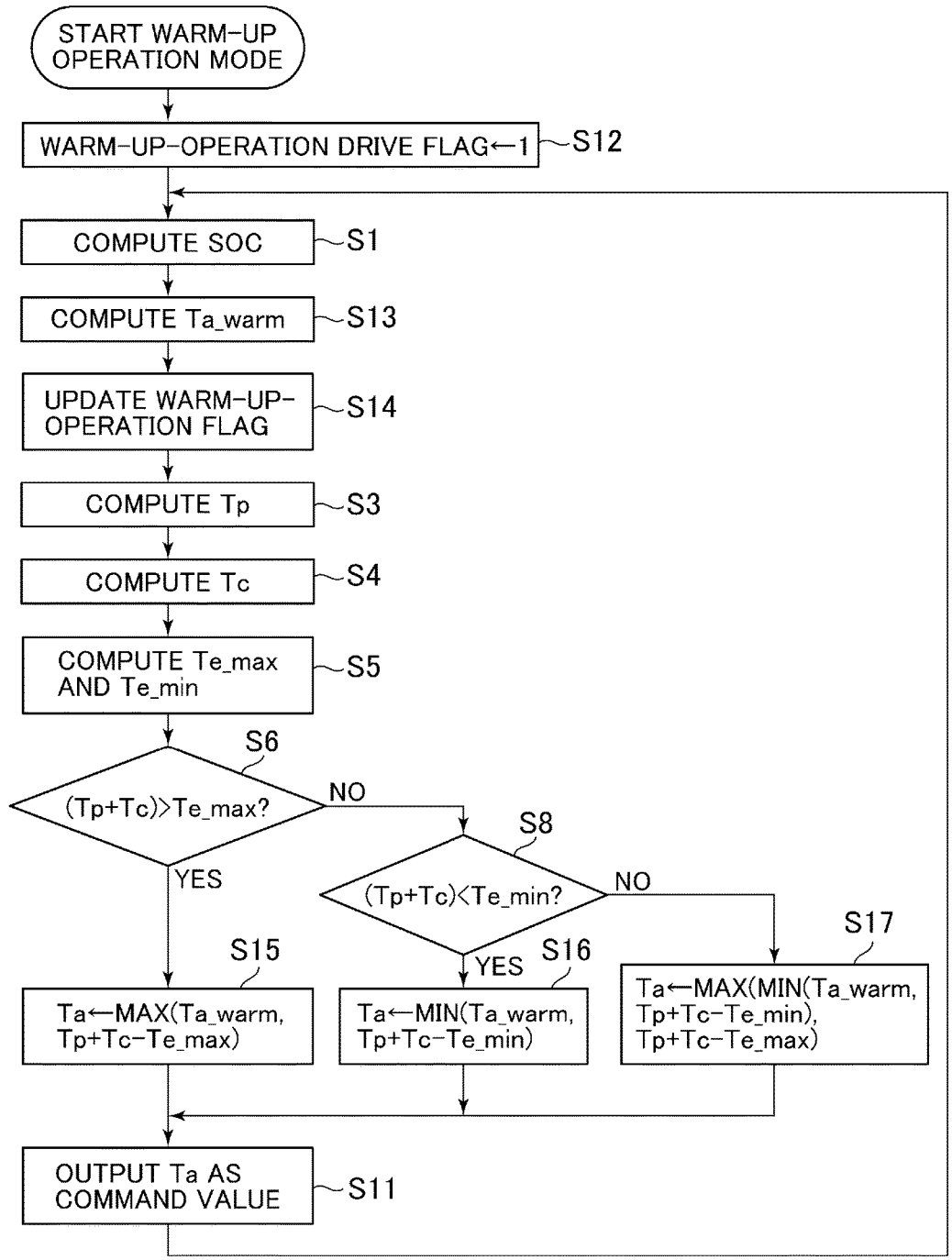
FIG. 8 is a flowchart illustrating warm-up-operation-mode processing performed by the controller which constitutes the embodiment of the hybrid work machine according to the present invention.
Figure 9:
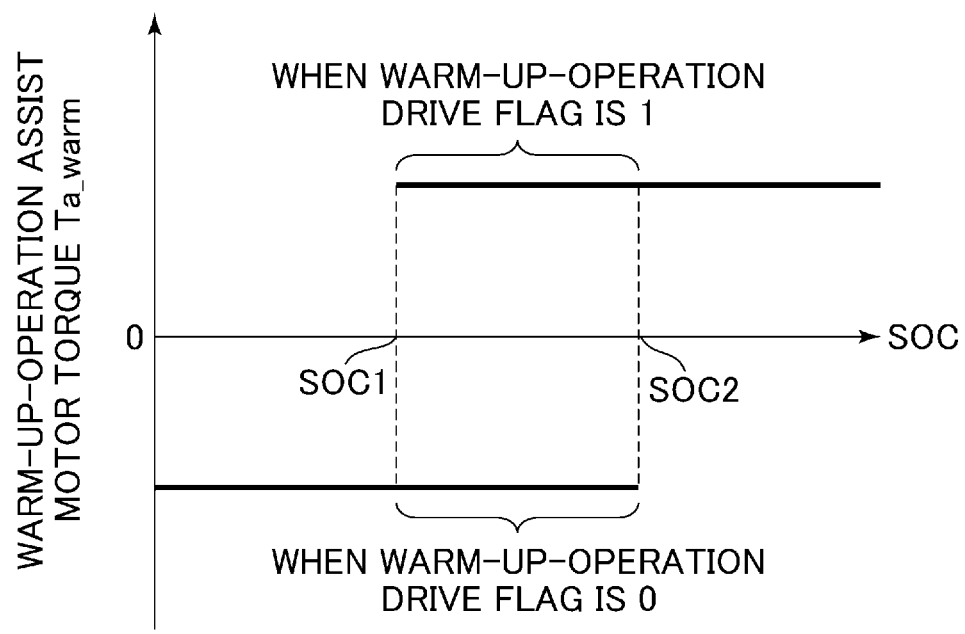
FIG. 9 is a characteristic view illustrating an example of a table for determining a warm-up operation torque in the controller which constitutes the embodiment of the hybrid work machine according to the present invention.

Next, a processing content of the warm-up-operation-mode torque-command-value arithmetic unit 83 will be described with reference to FIGS. 8 and 9. FIG. 8 is a flowchart illustrating warm-up-operation-mode processing performed by the controller which constitutes the embodiment of the hybrid work machine according to the present invention, and FIG. 9 is a characteristic view illustrating an example of a table for determining a warm-up operation torque in the controller which constitutes the embodiment of the hybrid work machine according to the present invention. The difference between the warm-up operation mode from the abovementioned normal operation mode is the use of a warm-up-operation assist motor torque Ta_warm as an alternative to the SOC-adjustment assist motor torque Ta_SOC. Parts different from those in FIG. 7 will be described below.

As shown in FIG. 8, the warm-up-operation-mode torque-command-value arithmetic unit 83 sets "1" to a warm-up-operation drive flag (Step S12). The warm-up-operation drive flag has a value of either "1" or "0," "1" represents drive, and "0" represents brake.

The warm-up-operation-mode torque-command-value arithmetic unit 83 estimates the current SOC (Step S1). The processing content is the same as that of the normal-operation-mode torque-command-value arithmetic unit 82 and is not, therefore, described herein.

The warm-up-operation-mode torque-command-value arithmetic unit 83 calculates the warm-up-operation assist motor torque Ta_warm (Step S13). Specifically, the warm-up-operation-mode torque-command-value arithmetic unit 83 calculates the Ta_warm in response to a current SOC value of the lithium-ion battery 24 and a value of the warm-up-operation drive flag on the basis of the example of the table shown in FIG. 9. It is noted that the example of the table of FIG. 9 is provided with a first threshold SOC1 and a second threshold SOC2 indicating an SOC value higher than an SOC value indicated by the first threshold SOC1.

The warm-up-operation-mode torque-command-value arithmetic unit 83 brakes the assist motor 23 (causes the assist motor 23 to generate power) when the current SOC value is equal to or lower than the first threshold SOC1, and drives (discharges) the assist motor 23 when the current SOC value is equal to or higher than the second threshold SOC2. When the current SOC value is between the first threshold SOC1 and the second threshold SOC2 and the warm-up-operation-mode torque-command-value arithmetic unit 83 drives the assist motor 23 in response to the value of the warm-up-operation drive flag, the warm-up-operation-mode torque-command-value arithmetic unit 83 continues to drive the assist motor 23 until the SOC becomes equal to the first threshold SOC. When the current SOC value is between the first threshold SOC1 and the second threshold SOC2 and the warm-up-operation-mode torque-command-value arithmetic unit 83 brakes the assist motor 23, the warm-up-operation-mode torque-command-value arithmetic unit 83 continues to brake the assist motor 23 until the current SOC becomes equal to the second threshold SOC2. As a result, the SOC value is controlled to fall between the first threshold SOC1 and the second threshold SOC2.

The warm-up-operation-mode torque-command-value arithmetic unit 83 updates the warm-up-operation drive flag (Step S14). Specifically, the warm-up-operation-mode torque-command-value arithmetic unit 83 sets "1" to the warm-up-operation drive flag when the warm-up-operation assist motor torque Ta_warm calculated in (Step S13) indicates Ta_warm>0, and the warm-up-operation-mode torque-command-value arithmetic unit 83 sets "0" to the warm-up-operation drive flag when Ta_warm<0.

The warm-up-operation-mode torque-command-value arithmetic unit 83 performs processing similar to the processing performed by the normal-operation-mode torque-command-value arithmetic unit 82 for (Steps S3 to S5, S6, and S8). The processing content is the same as that of the normal-operation-mode torque-command-value arithmetic unit 82 and is not, therefore, described herein.

The warm-up-operation-mode torque-command-value arithmetic unit 83 compares the value of ((Tp+Tc)−Te_max) with a value of the warm-up-operation assist motor torque Ta_warm and sets the higher value as the assist motor torque Ta (Step S15).

The warm-up-operation-mode torque-command-value arithmetic unit 83 compares the value of the ((Tp+Tc)−Te_min) with the value of the warm-up-operation assist motor torque Ta_warm and sets the lower value as the assist motor torque Ta (Step S16).

When the (Tp+Tc) a case other than the case where the (Tp+Tc) is lower than the Te_min in (Step S8), the warm-up-operation-mode torque-command-value arithmetic unit 83 compares the value of ((Tp+Tc)−Te_min) with the value of the warm-up-operation assist motor torque Ta_warm, selects the lower value, compares this selected value with the value of the ((Tp+Tc)−Te_max), and sets the higher value as the assist motor torque Ta (Step S17).

The warm-up-operation-mode torque-command-value arithmetic unit 83 outputs the assist motor torque Ta to the assist-motor inverter 53 as a command value (Step S11). After execution of the processing in (Step S11), the processing returns to (Step S1).

As described above, in the warm-up operation mode, the assist motor 23 can be controlled such that a charging/discharging amount of the lithium-ion battery 24 is set large and the temperature of the lithium-ion battery 24 promptly rises in the range in which the revolving speed of the engine 22 can be maintained even when the hydraulic pump torque or the accessory torque varies.

It is noted that the assist motor torque Ta can be increased by increasing the (Tp+Tc) as obvious from (Step S15) and (Step S17) shown in FIG. 8 when the warm-up-operation assist motor torque Ta_warm>0 and the total value (Tp+Tc) of the hydraulic pump torque Tp and the accessory torque Tc is low. In such a case, therefore, the controller 80 may control hydraulic-pump-torque increase means so as to increase the hydraulic pump torque Tp.

The hydraulic-pump-torque increase means may be, for example, means for increasing the capacity q of the hydraulic pump 41 and increasing a delivery flow rate thereof, and increasing the delivery flow rate leads to an increase in the hydraulic pump torque Tp.

Furthermore, the hydraulic-pump-torque increase means may be means for increasing the delivery pressure P of the hydraulic pump 41 by temporarily reducing the opening area of a part of the hydraulic line ranging from the hydraulic pump 41 to a tank by a solenoid valve of the opening-area control means 44 provided in the hydraulic line; in this case, the hydraulic pump torque Tp can be similarly increased (see mathematical expression (2)).

If the delivery flow rate is increased or the delivery pressure is increased while the actuator is being operated, operability degrades; therefore, the hydraulic-pump-torque increase means may be controlled to increase the hydraulic pump torque Tp only when the actuator is not operated. Alternatively, the hydraulic-pump-torque increase means may be controlled to increase the hydraulic pump torque Tp only while the gate lock lever is in the locking state so as to prevent the actuators from being operated while the delivery flow rate is increased or the delivery pressure is increased.

According to the embodiment of the hybrid work machine according to the present invention described above, it is possible to perform the warm-up operation on the lithium-ion battery 24 which is the electric storage device by charging and discharging while suppressing the occurrence of the lug-down or the over-revolution to the engine 22.

While the embodiment of the present invention has been described while taking the case where a total of the hydraulic pump torque Tp and the accessory torque Tc is used in calculating the assist motor torque Ta as an example, the present invention is not limited to this. For instance, the assist motor torque Ta may be calculated using only the hydraulic pump torque Tp.

It is to be noted that the present invention is not limited to the abovementioned embodiment but includes various modifications. For instance, the abovementioned embodiment has been described in detail for helping understand the present invention and the present invention is not necessarily limited to a feature provided with all the configurations described above.

DESCRIPTION OF REFERENCE CHARACTERS

10: Track structure
11: Crawler
12: Crawler frame
13a: Right track hydraulic motor
13b: Left track hydraulic motor
20: Swing structure
21: Swing frame
22: Engine
23: Assist generation motor
24: Lithium-ion battery
24a: Temperature sensor
25: Swing electric motor
26: Speed-reduction mechanism
30: Excavator mechanism
31: Boom
32: Boom cylinder
33: Arm
34: Arm cylinder
35: Bucket
36: Bucket cylinder
40: Hydraulic system
41: Hydraulic pump
42: Regulator
43: Control valve
44: Opening-area control means
52: Swing-electric-motor inverter
53: Assist-motor inverter
70: Electric-hydraulic signal conversion device
80: Controller
81: Mode switching determination unit
82: Normal-operation-mode torque-command-value arithmetic unit
83: Warm-up-operation-mode torque-command-value arithmetic unit
Ta: Assist motor torque
Tp: Hydraulic pump torque
Tc: Accessory torque

The invention claimed is:
1. A hybrid work machine comprising:
an engine;
an accessory mechanically connected to the engine;
an assist motor mechanically connected to the engine, causing a drive by generating a drive torque, and generating electric power by generating a brake torque;
a hydraulic pump driven by a total torque of the engine and the assist motor;
an electric storage device storing the electric power generated by the assist motor and supplying the electric power when the assist motor is driven;
an inverter allowing the electric storage device and the assist motor to transmit and receive the electric power therebetween;
a controller outputting a torque command signal to the inverter in order to control the drive torque or the brake torque of the assist motor; and
a temperature sensor detecting a temperature of the electric storage device, wherein
the controller comprises: a normal-operation-mode torque-command-value arithmetic unit and a warm-up-operation-mode torque-command-value arithmetic unit that each calculate a hydraulic pump torque (Tp) necessary to drive the hydraulic pump, an accessory torque (Tc) necessary to drive the accessory, and that each calculate the torque command signal based on a total value (Tp+Tc) of the hydraulic pump torque and the accessory torque; and
a mode switching determination unit, the mode switching determination unit capturing a temperature signal for the electric storage device detected by the temperature sensor, outputs the torque command signal calculated by the warm-up-operation-mode torque-command-value arithmetic unit when the temperature of the electric storage device is lower than a preset first temperature threshold, and outputs the torque command signal calculated by the normal-operation-mode torque-command-value arithmetic unit when the temperature of the electric storage device is higher than a second temperature threshold preset to a value equal to or higher than the first temperature threshold,
the normal-operation-mode torque-command-value arithmetic unit, in a case where Te_max≥(Tp+Tc)≥Te_min, carries out a first comparison in which the normal-operation-mode torque-command-value arithmetic unit compares a value of [(Tp+Tc)−Te_min] with a value of Ta_SOC, and the normal-operation-mode torque-command-value arithmetic unit then selects a lower value of the first comparison,
the normal-operation-mode torque-command-value arithmetic unit then carries out a second comparison in which the normal-operation-mode torque-command-value arithmetic unit compares the selected lower value of the first comparison with a value of [(Tp+Tc)−Te_max], and
the normal-operation-mode torque-command-value arithmetic unit then sets a higher value of the second comparison as the torque of the assist motor Ta, wherein
Te_min is a minimum torque of the engine, Tc is an accessory torque, Ta_SOC is an adjustment assist motor torque based on a current state of charge of the electric storage device, Ta is the torque of the assist motor, and Te_max is an engine maximum torque.

2. The hybrid work machine according to claim 1, wherein
the warm-up-operation-mode torque-command-value arithmetic unit, in a case where Te_max≥(Tp+Tc)≥Te_min, carries out a third comparison in which the warm-up-operation-mode torque-command-value arithmetic unit compares a value of [(Tp+Tc)−Te_min] with a value of T_warm, and the warm-up-operation-mode torque-command-value arithmetic unit then selects a lower value of the third comparison,
the warm-up-operation-mode torque-command-value arithmetic unit then carries out a fourth comparison in which the warm-up-operation-mode torque-command-value arithmetic unit compares the selected lower value of the third comparison with a value of [(Tp+Tc)−Te_max], and the warm-up-operation-mode torque-command-value arithmetic unit then sets a higher value of the fourth comparison as the torque of the assist motor Ta, wherein T_warm is a warm-up-operation assist motor torque.

3. The hybrid work machine according to claim 2, wherein the warm-up-operation-mode torque-command-value arithmetic unit outputs the torque command signal such that the assist motor generates the drive torque when a charge rate of the electric storage device is equal to or higher than a first charge rate threshold and a total value of the hydraulic pump torque and the accessory torque is higher than the minimum torque of the engine.

4. The hybrid work machine according to claim 3, further comprising:

a hydraulic-pump-torque increase means for increasing the torque of the hydraulic pump, wherein the hydraulic-pump-torque increase means is a regulator changing a capacity of the hydraulic pump by changing a tilting angle of the hydraulic pump, and the controller controls the regulator to increase a delivery flow rate of the hydraulic pump when the charge rate of the electric storage device is equal to or higher than the first charge rate threshold and the torque of the hydraulic pump is lower than a preset torque threshold.

5. The hybrid work machine according to claim 3, further comprising:

a hydraulic-pump-torque increase means for increasing the torque of the hydraulic pump, wherein the hydraulic-pump-torque-increase means is a solenoid valve of an opening-area control means provided in a hydraulic line ranging from the hydraulic pump to a tank, and the controller controls the solenoid valve to increase a delivery pressure of the hydraulic pump when the charge rate of the electric storage device is equal to or higher than the first charge rate threshold and the torque of the hydraulic pump is lower than a preset torque threshold.

\* \* \* \* \*